July 24, 1962  R. M. BELL ET AL  3,045,560
APPARATUS FOR AND METHOD OF MANUFACTURING FLEXIBLE CONTAINERS
Filed June 11, 1958  9 Sheets-Sheet 1
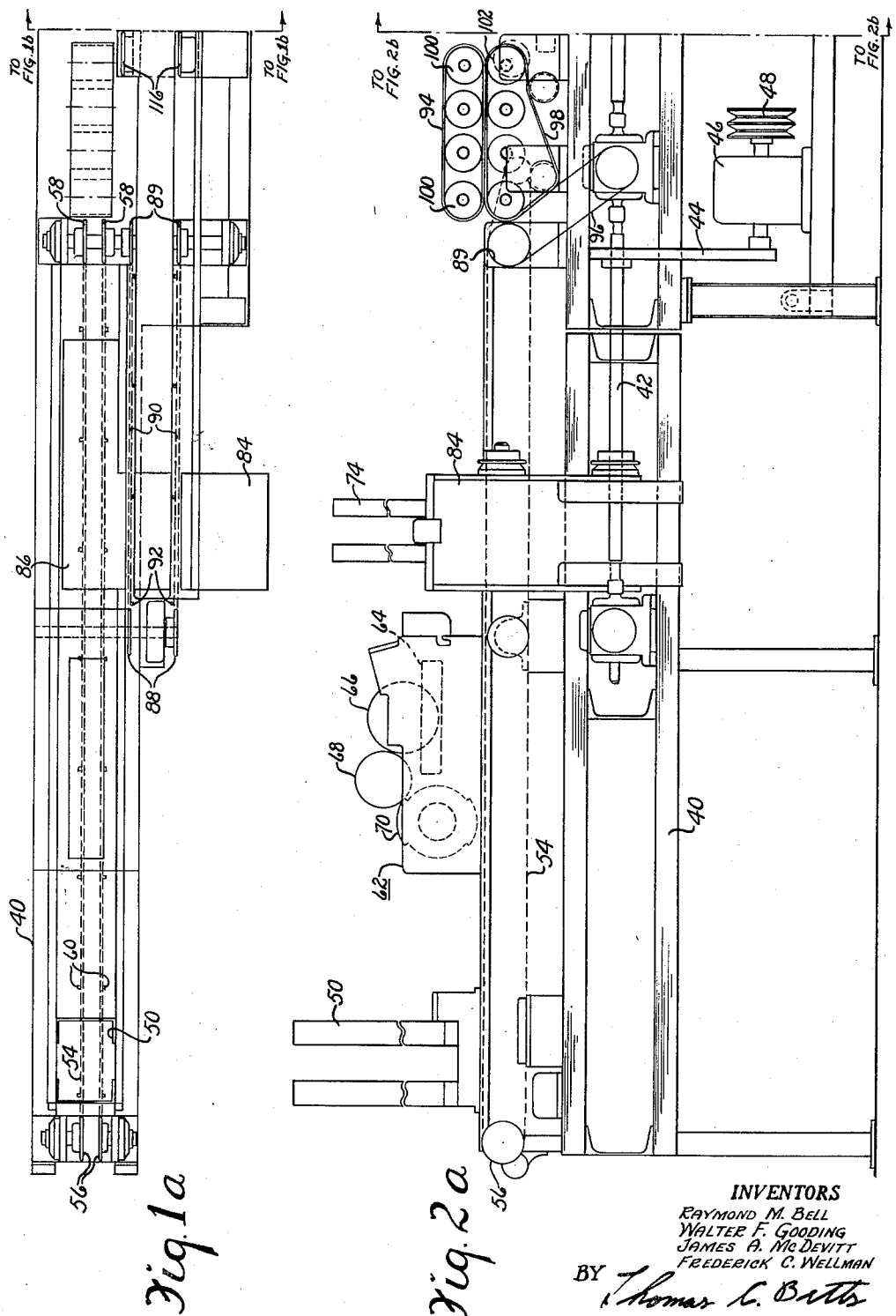
INVENTORS
RAYMOND M. BELL
WALTER F. GOODING
JAMES A. McDEVITT
FREDERICK C. WELLMAN
BY Thomas C. Betts
THEIR ATTORNEY July 24, 1962 R. M. BELL ET AL 3,045,560
APPARATUS FOR AND METHOD OF MANUFACTURING FLEXIBLE CONTAINERS
Filed June 11, 1958 9 Sheets-Sheet 2
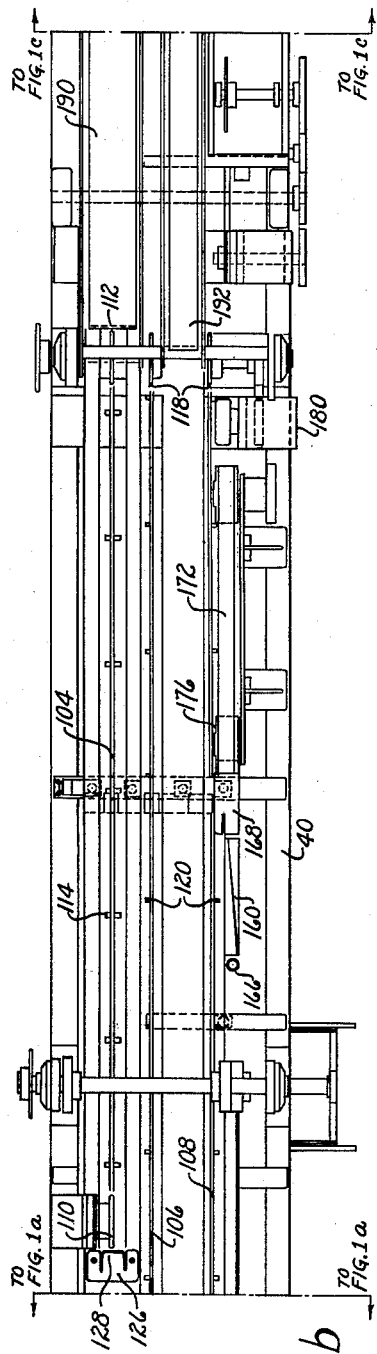
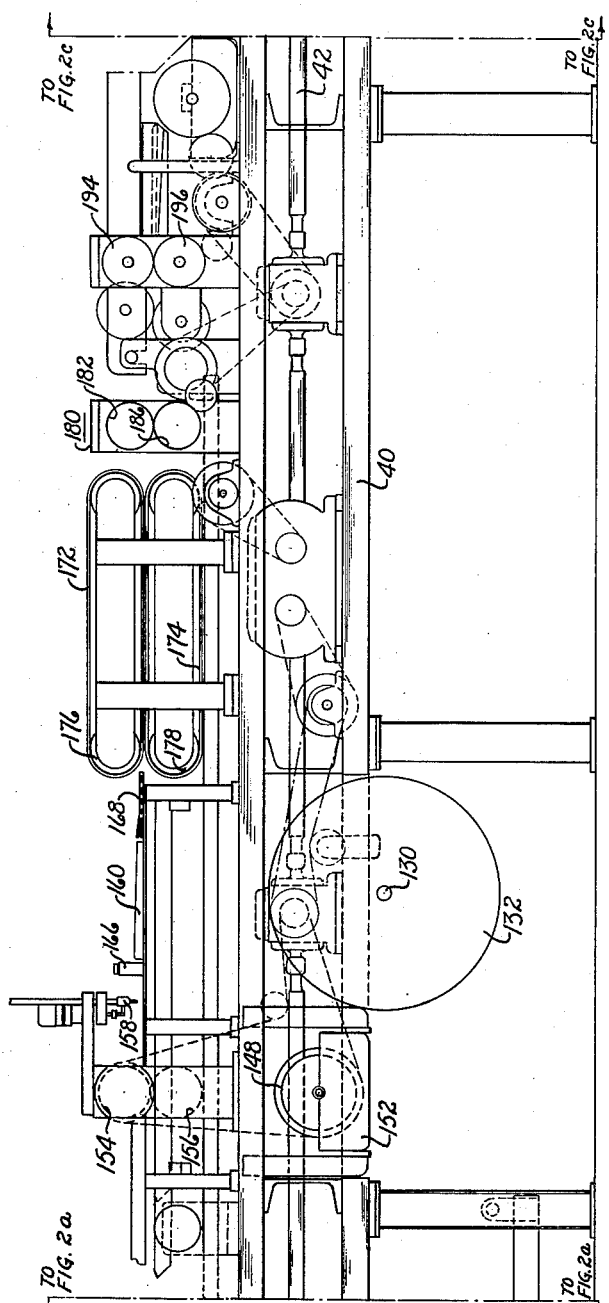
INVENTORS
RAYMOND M. BELL
WALTER F. GOODING
JAMES A. McDEVITT
FREDERICK C. WELLMAN
BY Thomas C. Betts
THEIR ATTORNEY

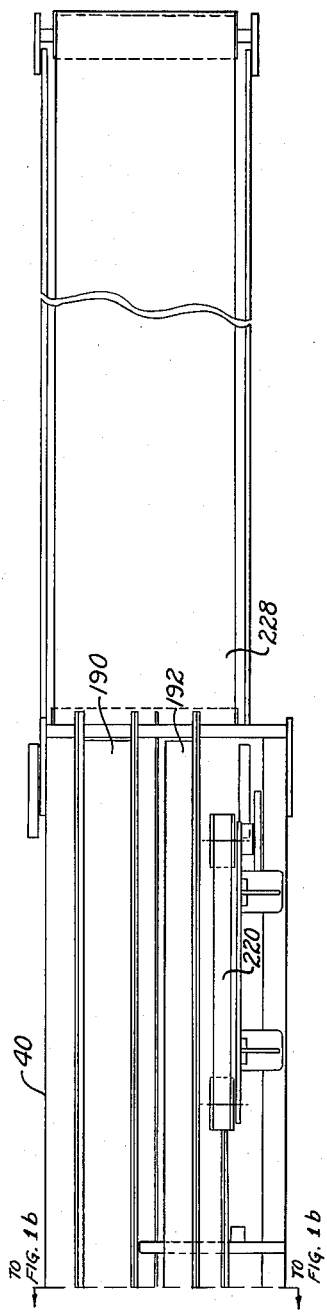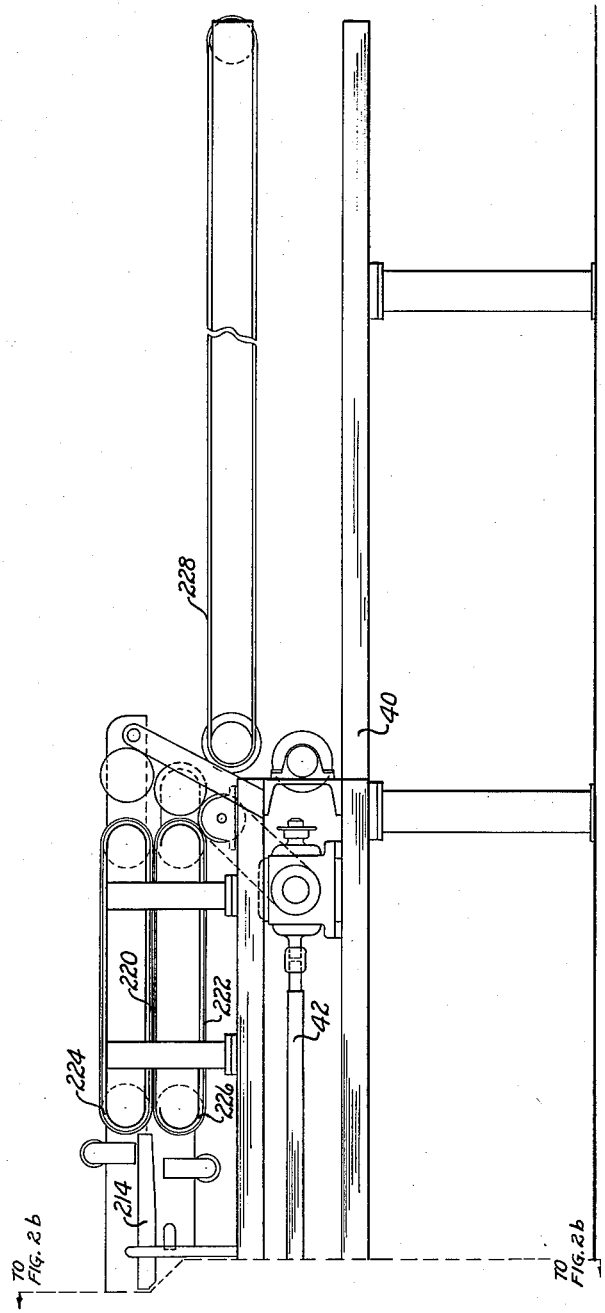

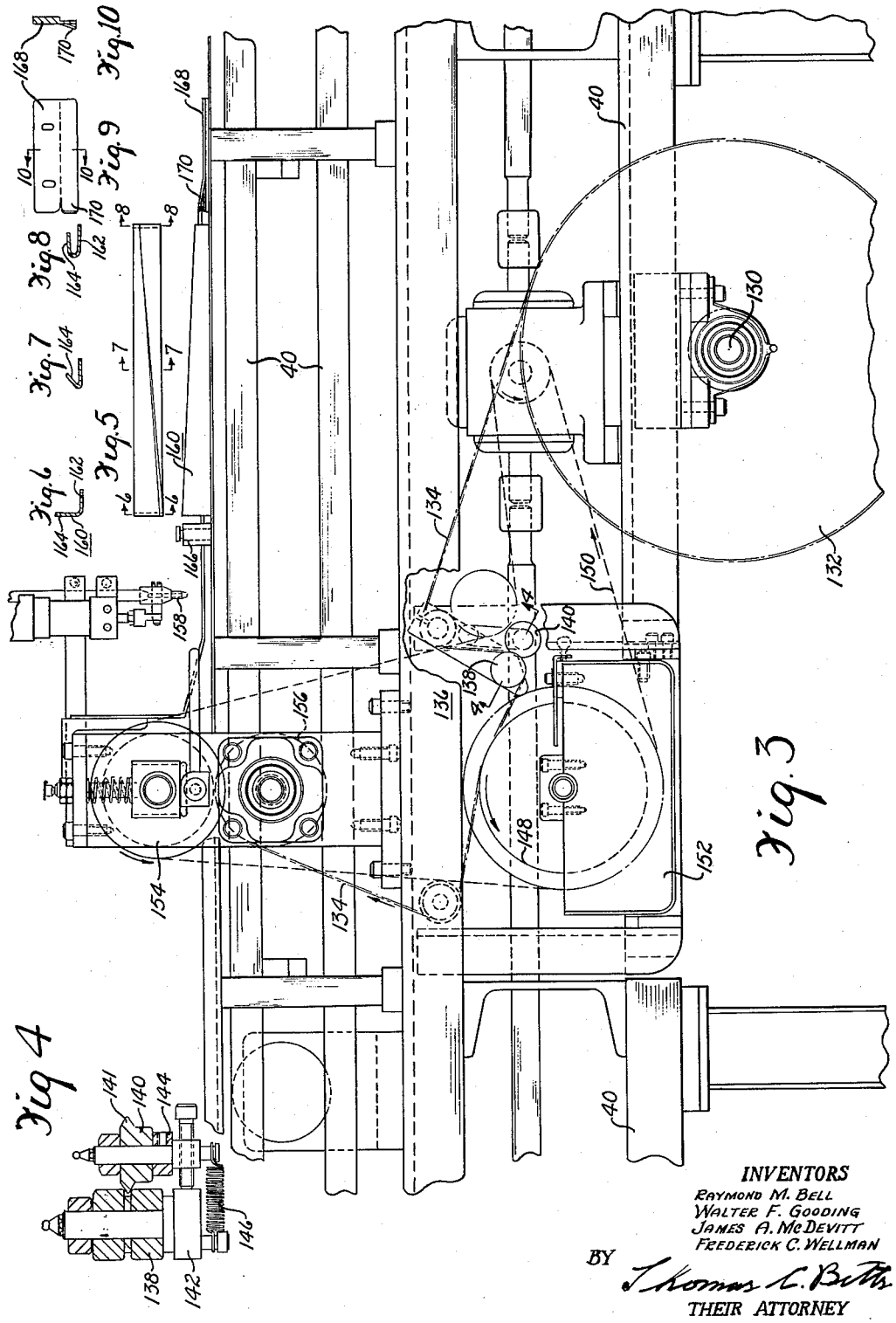

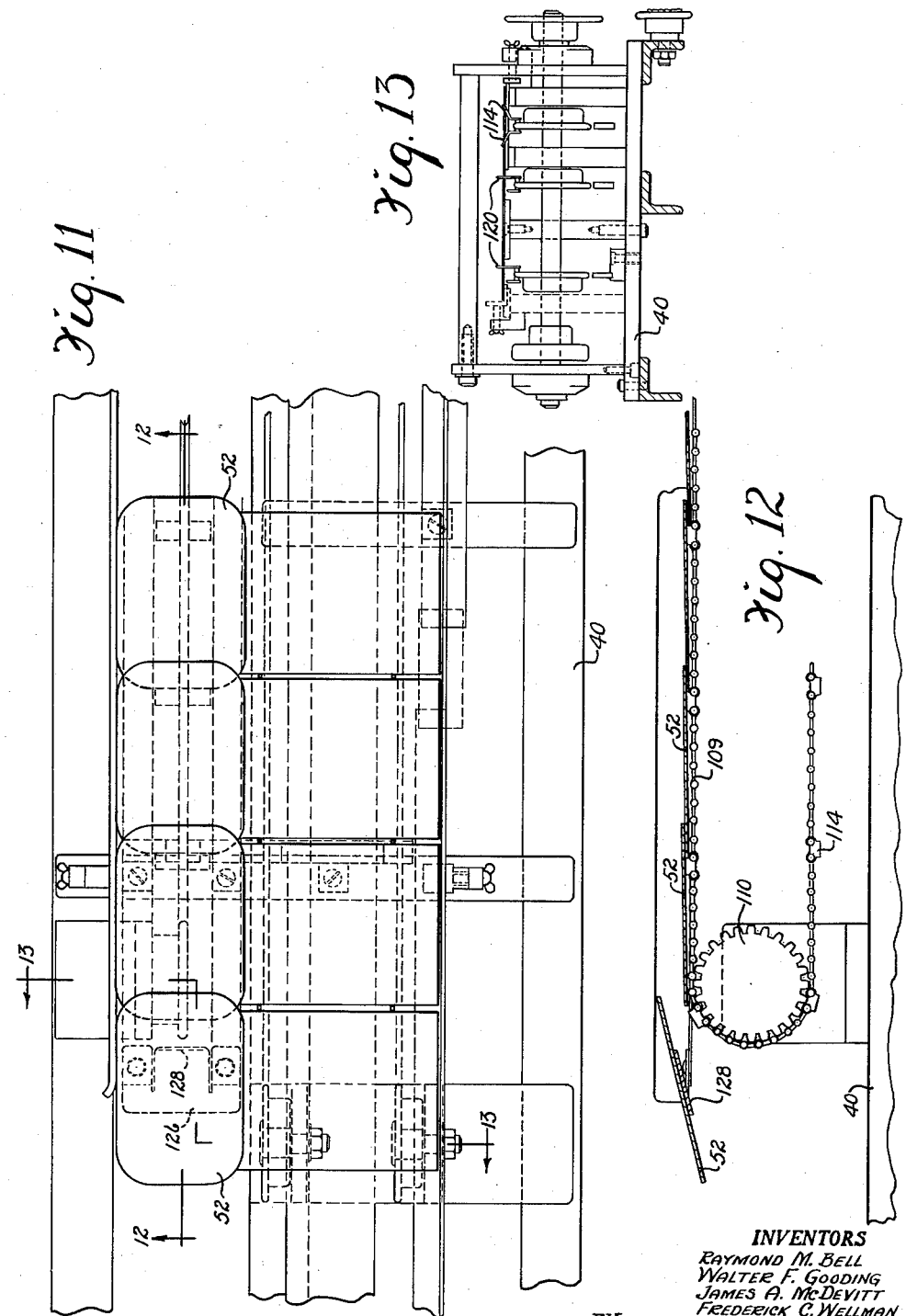

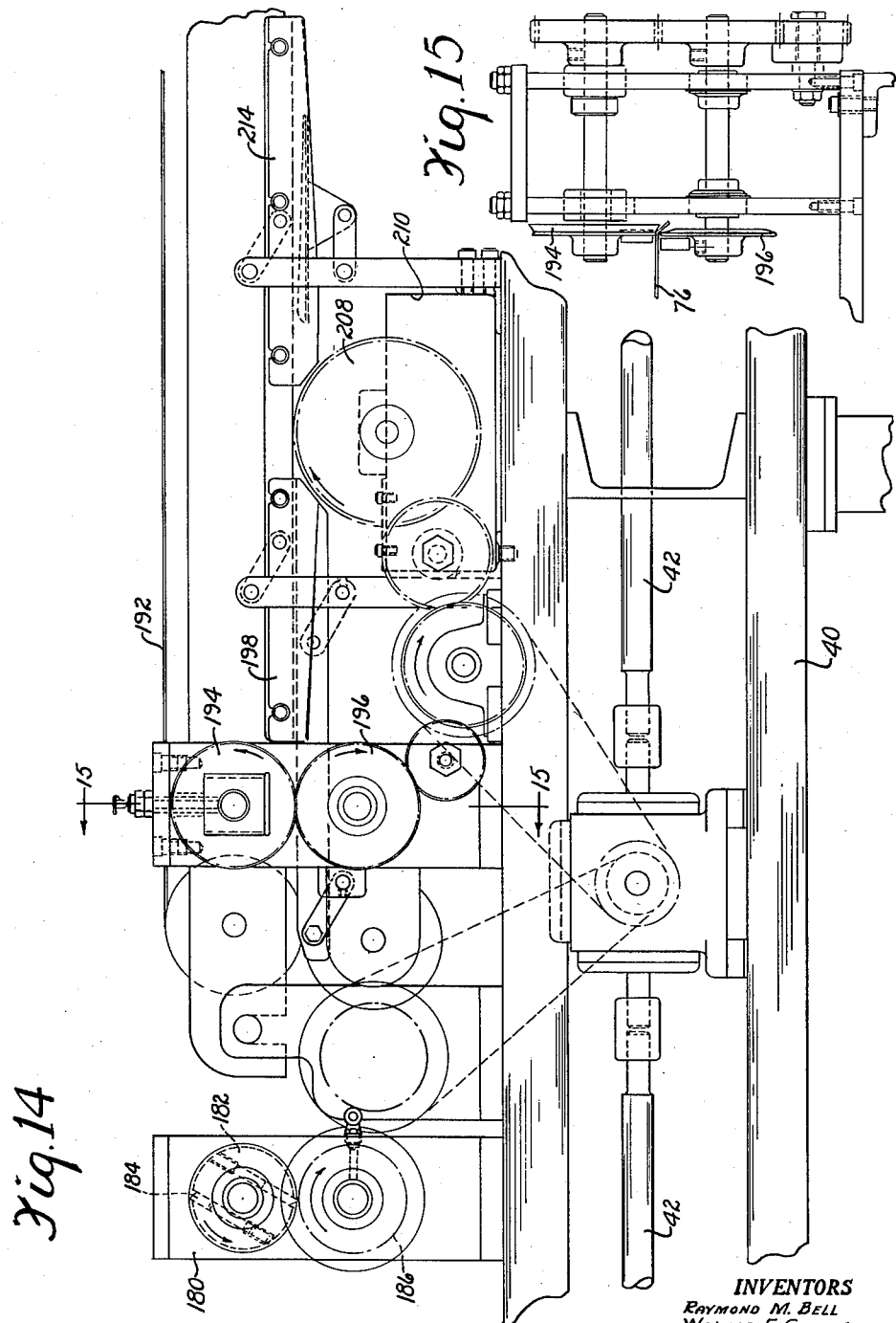

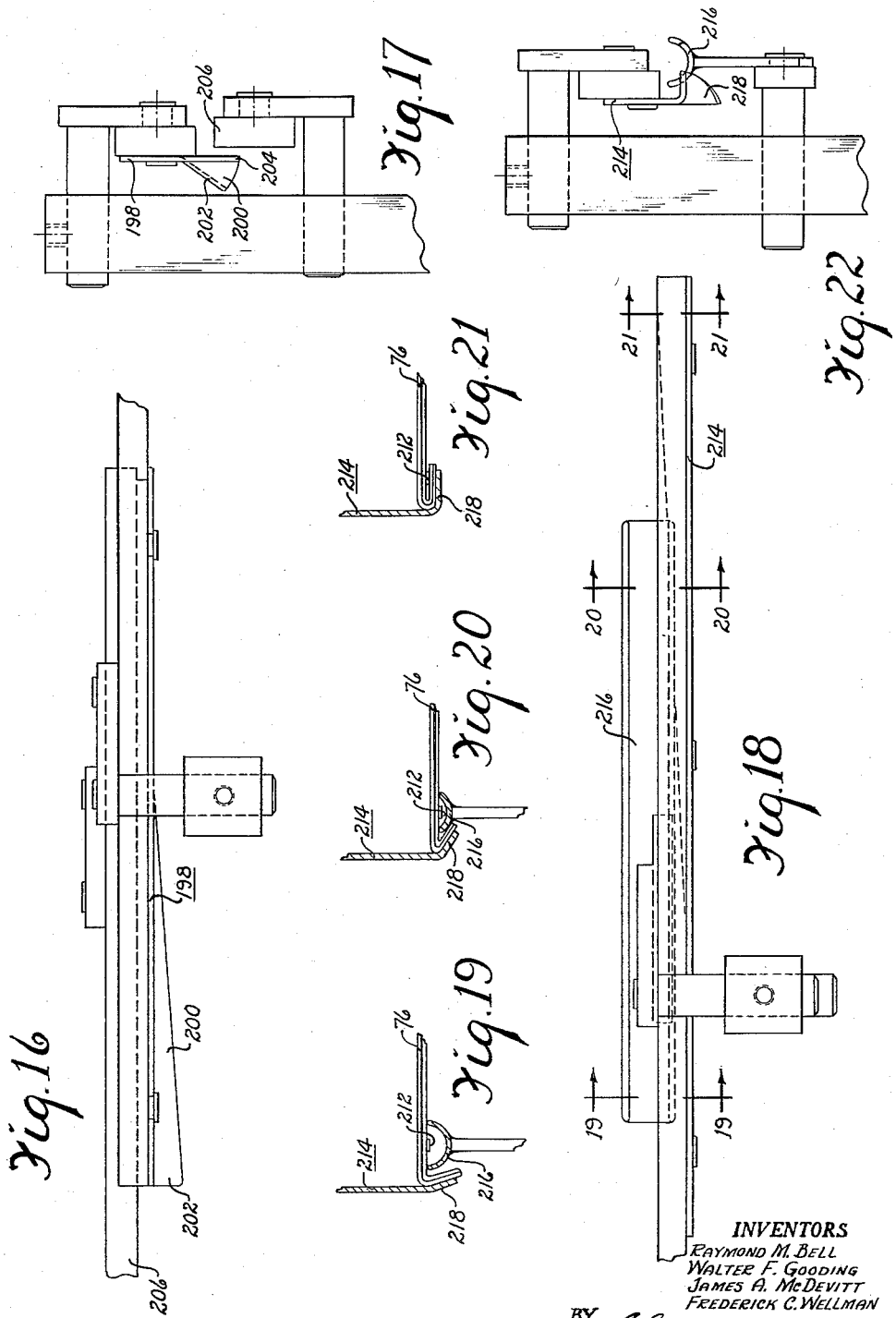

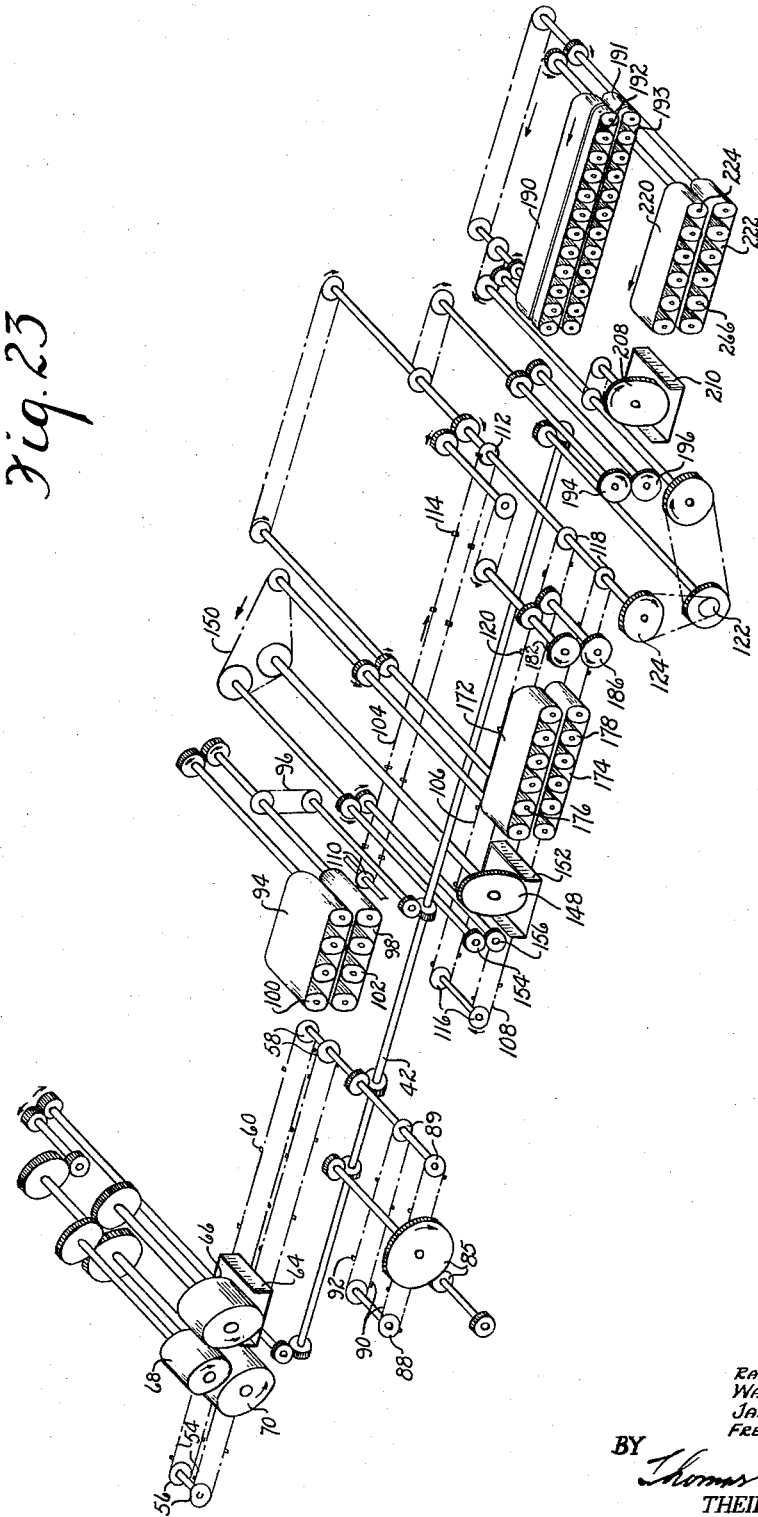

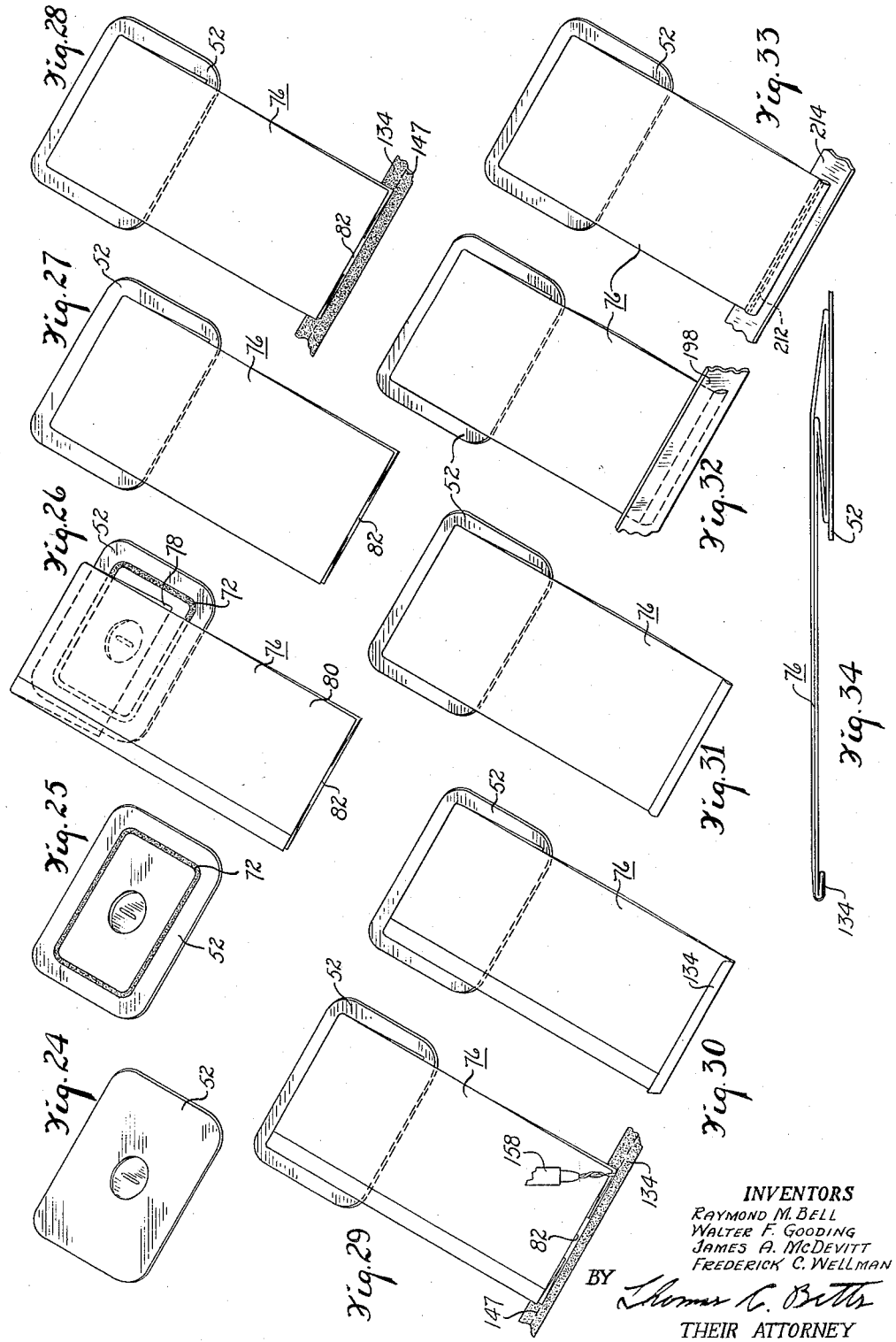

United States Patent Office 3,045,560
Patented July 24, 1962

3,045,560
APPARATUS FOR AND METHOD OF MANU-
FACTURING FLEXIBLE CONTAINERS
Raymond M. Bell, St. Davids, Walter F. Gooding,
Berwyn, and Fred C. Wellman, Bryn Mawr, Pa., and
James A. McDevitt, Mount Vernon, Ohio, assignors to
Electrolux Corporation, Old Greenwich, Conn., a cor-
poration of Delaware
Filed June 11, 1958, Ser. No. 741,310
20 Claims. (Cl. 93—8)

Our invention relates to improvements in the method of and apparatus for manufacturing flexible containers, and more specifically to a method of and apparatus for closing the ends of disposable paper dust bags for use in vacuum cleaners. In Patent No. 2,779,255 of January 29, 1957 there is disclosed a method of and apparatus for making dust bags which includes applying a stiff cardboard disc to the end of a paper bag and then gluing and folding over the opposite end to effect a closure thereof. As therein shown, it is necessary to make a double fold in order that the resulting closure be dust tight.

According to the present invention this closure is effected by first applying sealing tape to the end of each bag and then gluing and folding over the end with but a single fold. The advantage of this over that shown in the prior patent is that over an inch of paper is saved per bag and the bags are less bulky at their closed ends.

In accordance with the present invention the discs are applied to the bags in the same manner as that disclosed in the above mentioned patent. That is to say, the discs are moved lengthwise along a path, and bags are moved in timed relation to meet the moving discs to which adhesive has been applied and the discs and bags are pressed together to cause them to adhere. During this stage of the fabrication it is necessary that the discs and consequently the bags be moved in spaced relation to each other. Thereafter, in accordance with the present invention the speed of travel of the bags and discs is reduced sufficiently to reduce the spacing between the bags until the side edges of adjacent bags are in close proximity to each other. In order to accomplish this it is necessary to overlap the discs of adjacent bags, inasmuch as each disc projects beyond the sides of its bag. A continuous strip of sealing tape is creased longitudinally along its center line so as to give it a trough shape. The creased tape is moved at the same reduced speed at which the bags are traveling and the portion of the tape on one side of the crease is applied to the ends of the bags with the other portion extending outwardly and upwardly. A stream of adhesive is introduced into the trough formed by the tape and some of it flows into the open ends of the bags. Immediately thereafter the extending half of the tape is folded over the ends of the bags and pressure is applied to cause the folded over tape to adhere to the bags. The adhesive which has been introduced into the open ends causes the opposite side walls of each bag to adhere together, thus producing a dirt-tight closure.

Thereafter the tape is severed between each bag, and due to the fact that the bags are very close together, there is no wastage of tape and there are no pieces of scrap which require disposal. After being thus cut apart, speed of travel of the bags is again increased sufficiently so as to separate the discs from each other and the taped ends of the bags are glued and folded over.

Further objects and advantages of our invention will be apparent from the following description when considered in connection with the accompanying drawings which form a part of this specification and of which:

FIG. 1a is a top view of the left-hand portion of an apparatus in accordance with the present invention;

FIG. 1b is a top view of the central portion of this apparatus;

FIG. 1c is a top view of the right-hand portion of the apparatus;

FIG. 2a is a side view of the portion of the apparatus shown in FIG. 1a;

FIG. 2b is a side view of the portion of the apparatus shown in FIG. 1b;

FIG. 2c is a side view of the portion of the apparatus shown in FIG. 1c;

FIG. 3 is a side view on a somewhat enlarged scale of the part of the apparatus shown in the left-hand portion of FIG. 2b;

FIG. 4 is a cross-sectional view on a still larger scale taken on the line 4—4 of FIG. 3;

FIG. 5 is a top view of a portion of the apparatus shown directly therebeneath in FIG. 3;

FIG. 6 is a cross-sectional view taken on the line 6—6 of FIG. 5;

FIG. 7 is a cross-sectional view taken on the line 7—7 of FIG. 5;

FIG. 8 is a cross-sectional view taken on the line 8—8 of FIG. 5;

FIG. 9 is a top view of a part of the apparatus shown directly therebeneath in FIG. 3;

FIG. 10 is a cross-sectional view taken on the line 10—10 of FIG. 9;

FIG. 11 is a top view of a part of the apparatus shown in FIG. 3;

FIG. 12 is a cross-sectional view taken on the line 12—12 of FIG. 11;

FIG. 13 is a cross-sectional view taken on the line 13—13 of FIG. 11;

FIG. 14 is a side view on an enlarged scale of a portion of the apparatus shown in FIGS. 2b and 2c;

FIG. 15 is a cross-sectional view taken on the line 15—15 of FIG. 14;

FIG. 16 is a top view on a still larger scale of a folding device shown near the center of FIG. 14;

FIG. 17 is an end view of the parts shown in FIG. 16;

FIG. 18 is a top view of a folding device shown at the right-hand end of FIG. 14;

FIG. 19 is a cross-sectional view taken on the line 19—19 of FIG. 18;

FIG. 20 is a cross-sectional view taken on the line 20—20 of FIG. 18;

FIG. 21 is a cross-sectional view taken on the line 21—21 of FIG. 18;

FIG. 22 is an end view of the apparatus shown in FIG. 18;

FIG. 23 is a schematic drawing showing the drives of certain parts shown in the preceding figures;

FIG. 24 is a perspective view of a cardboard disc as supplied to the machine;

FIG. 25 is a perspective view of the disc after a glue line has been applied thereto;

FIG. 26 is a perspective view of the disc shown in FIG. 25 and a paper bag which has been brought into alignment therewith;

FIG. 27 is a perspective view showing the bag glued to the disc;

FIG. 28 is a perspective view showing one-half the width of a strip of tape applied to the open end and of the bag;

FIG. 29 shows the introduction of a stream of adhesive into the trough formed at the open end of the bag by the strip of tape;

FIG. 30 shows the other half of the tape partially folded over the open end of the bag;

FIG. 31 shows the tape completely folded over and sealed to the bag;

FIG. 32 shows a bag with the taped end thereof partially folded over;

FIG. 33 shows the bag with the taped end completely folded over against a stripe of adhesive; and FIG. 34 is a side view of a completed dust container.

Referring to the drawings, reference character 40 designates generally a frame along the greater length of which runs a power shaft 42. This shaft is driven by a belt or chain 44 from a speed changing device 46 which in turn is driven by a motor through a suitable drive, such as a multiple belt drive engaging the pulleys 48. For the sake of clarity, the driving connections between this shaft and the various driven parts have not been shown in detail in FIGS. 1 and 2, but are illustrated schematically in FIG. 23.

*Bag and Disc Combining*

Mounted on the left-hand end of frame 40, as is shown in FIGS. 1a and 2a, is a magazine 50 for containing a stack of cardboard discs, such as is designated by reference character 52 in FIG. 24. A pair of conveyor chains 54 engages sprocket wheels 56 at one end and sprocket wheels 58 at the other end and pass underneath the lower end of magazine 50. These chains are provided with spaced projections 60, a pair of which engages the end edge of the lowermost disc in the magazine 50 and conveys it towards the right as viewed in FIGS. 1a and 2a. The projections 60 are spaced apart a sufficient distance so that successive discs travel in spaced relationship to each other.

Reference character 62 designates generally a glue applying device which comprises a glue reservoir 64, a pick-up roller 66, a transfer roller 68 and a glue printing roller 70. These rollers are driven from the main drive shaft 42 by a suitable gear train such as is shown schematically in FIG. 23 so that the peripheral speeds of all the rollers are the same as the linear speed of the discs as conveyed by the chains 54. The printing roller 70 is timed so that it makes a half revolution as each disc passes thereunderneath and prints a rectangular glue line designated by reference character 72 in FIG. 25.

Reference character 74 designates generally a magazine for containing paper bags of the type designated by reference character 76 in FIG. 26. Each bag is formed with a rectangular end 78 which is folded so as to lie flat with respect to the side walls 80 of the bag, and the opposite end of the bag is open, as is indicated at 82. These bags are fed from the hopper 74 by means of a device designated generally by reference character 84 in FIGS. 1a and 2a. This bag feeding device may be of the type shown in FIG. 5 through FIG. 14 in the above mentioned Patent No. 2,779,255, but as it forms per se no part of the present invention, it is not described herein. Suffice it to say that device 84 is driven in timed relation to the conveyor chains 54, as by the gear train 85 shown schematically in FIG. 23, so that a bag 76 is moved lengthwise onto a platform 86 as a disc 52 is moved below the platform by the conveyor chains 54. Pairs of sprockets 88 and 89 carry bag conveyor chains 90 which are provided with upwardly projecting fingers 92 which serve to engage the side edge of a bag and move it sideways to the right as viewed in FIG. 1a along the platform 86, the fingers extending upwardly through slots formed in the platform. The projections 92 are spaced sufficiently ahead of the projections 60 on the disc conveyor chains 54 so that a bag 76 is moved along the platform 86 with its rectangular end 78 in centered relation to a disc 52 moving underneath the platform. As each bag is moved off the right-hand end of the platform it comes into contact with a disc 52 which has the glue line 72 thereon. At this point the disc reaches the ends of its conveyor chains 54 and the disc and the rectangular end of the bag are engaged and carried along between pressure belts 94 and 98 which pass around the rollers 100 and 102, respectively, which are driven from shaft 42 by a chain 96. During their passage between these belts the pressure applied causes the rectangular end of the bag to adhere securely to the disc.

The machine so far described is substantially the same as that portion of the machine which assembles the bags to the discs in the aforementioned Patent No. 2,779,255 to which reference may be had for further details.

*Tape Applying*

When the bag with the attached disc is discharged from the right-hand end of the pressure belts 94 and 98 it is deposited on conveyor chains 104, 106 and 108. Chain 104 runs over sprocket wheels 110 and 112 and is provided with pairs of projecting fingers 114 which engage the left-hand ends of the discs. Chain 106 and 108 run between pairs of sprocket wheels 116 and 118 and each chain carries projecting fingers 120 which engage the left-hand side edge of each bag. The fingers 120 are set ahead of the fingers 114 by a distance equal to the distance the disc projects beyond the side of the bag.

As is shown more particularly in FIGS. 2b and 23, sprocket wheels 112 and 118 are driven from the main drive shaft 42 through a train which includes sprocket wheel 122 driving a larger sprocket 124, thereby providing a speed reduction. In other words, the conveyor chains 104, 106 and 108 have a linear speed which is less than that of the conveyor chains 54 and 90 and the pressure belts 94 and 98. Consequently, as the bags with discs attached are deposited on the conveyor chains 104, 106 and 108 their speed is reduced with the result that the space between them is reduced. This difference in speed is so selected that the adjacent side edges of successive bags are brought into close proximity with each other, as is shown in FIG. 11. Inasmuch as the discs 52 project laterally beyond the side edges of the bags, this means that the discs of successive bags must be in overlapping relationship, as illustrated in FIGS. 11 and 12. In order to assure that the discs will overlap, a member 126 is provided between the discharge end of the pressure belts 94 and 98 and the slower moving conveyor chain 104. This member 126 is provided with an upwardly inclined portion 128 which, as is shown in FIG. 12, assures that the advancing edge of a disc as it is discharged from between the pressure belts is raised sufficiently to clear the trailing edge of the disc immediately ahead of it, which by this time is lying flat on the conveyor chain 104.

Rotatably mounted on a shaft 130 carried by the frame 40 is a roll of tape 132, preferably made of paper. A continuous strip 134 of this tape passes from the roll through a creasing device designated generally by reference character 136, shown particularly in FIGS. 3 and 4. This creasing device includes a grooved roller 138 and a roller 140 having a land 141 mounted on arms 142 and 144, respectively. A coil spring 146 urges these rollers towards each other to cause the land to enter the groove and consequently as the tape passes therebetween a center crease 147 (FIGS. 28 and 29) is formed lengthwise of the tape.

After the tape has passed through the creasing device 136 it passes over a glue printing roller 148 which is driven by means of a chain 150. The printing roller 148 rotates within an adhesive reservoir 152 and consequently picks up adhesive and applies it to the strip of tape passing in contact with the roller. After leaving the printing roller, the portion of the strip on one side of the center crease 147 passes between pressure rollers 154 and 156, which are also driven by the chain 150. As is more clearly shown in FIG. 23, the rollers 154 and 156 are driven at a speed such that their peripheries have a linear speed the same as that of the slower moving conveyor chains 104, 106 and 108 and as the bags are moved by these chains their open ends pass between the pressure rollers 154 and 156 in contact with the aforementioned portion of the tape to one side of the center crease 147, as is indicated diagrammatically in FIG. 28. Due to the fact that adhesive has been applied to the tape, application of pressure by the rollers 154 and 156 causes one-half of its width to adhere to the bags, while the other half extends outwardly therebeyond and, because of the crease formed in the tape, is also extends upwardly. Into the trough thus formed by the bags and the creased tape a stream of adhesive is introduced by means of the nozzle 158. As the tape passes to the right of the nozzle, as viewed in FIG. 3, it is gradually folded along its crease line 147 over the open ends of the bags by means of a guide strip 160. At the left-hand end this strip is L-shaped, as seen particularly in FIG. 6, having a horizontal leg 162 and a vertical leg 164. The leg 164 is shaped so as to be inclined at the middle of the guide strip 160, as is shown in FIG. 7, and to be parallel with the horizontal leg 162 at the opposite end, as is shown in FIG. 8.

Immediately to the left of the guide strip 160 is a roller 166 mounted on a vertical axis. At this point the tape has been folded about half way over and consequently the half of the tape which extends beyond the ends of the bags is in a substantially vertical position as it passes by the roller 166, which serves to guide it into strip 160. The adhesive, as it is introduced by the nozzle 158 into the trough shaped tape, starts to flow into the open ends of the bags and this flow is aided by the raising up and folding over of the outer half of the tape. Thus by the time the bags and tape reach the right-hand end of guide 160 all of this adhesive has either entered the open ends of the bags or is between the outer surface of the bag and the folded over strip of tape. The rate of flow of adhesive through the nozzle 158 is so regulated that the quantity supplied is just sufficient for the above described purpose. It is important to introduce adhesive into the open ends of the bags so that the opposite walls of the bags at this end will be adhered together in order to provide a dust tight closure.

As the bags and continuous strip of tape leave the right end of guide 160 they pass underneath a guide plate 168 which has an inclined end portion 170. This serves to further compress the folded over tape against the side walls of the bag. As soon as the bags and tape pass to the right of the guide plate 168 they enter between pressure belts 172 and 174 (FIG. 2b) which are supported by rollers 176 and 178, respectively. These belts are driven at the same speed as the conveyor chains 104, 106 and 108 and serve to apply pressure to the folded over tape so as to cause it to adhere firmly to the ends of the bags. These pressure belts also serve to pull the tape through the machine from the roller 132.

When the bags and strip of tape leave the pressure belts 172 and 174 the taped ends pass through a rotary cutter designated generally by reference character 180 and shown best in FIG. 14. This includes a wheel 182 carrying a pair of knives 184, which cut against the cylindrical surface of a roller 186. Rollers 182 and 186 are driven at a speed such that their peripheral speed is the same as the linear speed of the conveyor chains 104, 106 and 108 which are carrying the bags as they pass this point. Half the circumference of the roller 182 is equal to the width of a bag and the roller 182 is so timed that, as the taped together bags pass between the rollers 182 and 186 a knife 184 comes into cutting position against the roller 186 in alignment with the small space between adjacent bags. Consequently, the knife cuts the tape between the two bags.

*Bag End Folding*

Shortly after the bags have been separated by the device 180, they reach the right-hand ends of the conveyor chains 104, 106 and 108. As each bag reaches this point, the leading edge of the disc is engaged between carrying belts 190 and 191, and the leading edge of the bag between belts 192 and 193. As will be seen from FIG. 23, these carrying belts are driven at the same speed as the drive shaft 42 and hence at a higher speed than the conveyor chains 104, 106 and 108, and the increase in speed which is thus imparted to the bags by these carrier belts is sufficient to increase the spacing between adjacent bags so that their discs do not overlap.

As the bags and discs are carried to the right by the belts 190, 191, 192 and 193 the walls of the bags adjacent to their taped ends which project beyond the belts 192 and 193 pass between creasing rollers 194 and 196 which, as is shown particularly in FIG. 15, form a crease in the bag parallel to their taped ends. Thereafter, the taped ends of the bags come in contact with a folding bar 198 shown particularly in FIGS. 16 and 17. As here shown, bar 198 has a flange portion 200 which is inclined outwardly at the left end, as is indicated at 202 and gradually changes so as to be substantially vertical at its right end, as is indicated at 204. As the creased ends of the bags are moved from the left to the right along a supporting rail 206, the bar 198 causes them to fold about their crease lines and around the edge of rail 206 until they are folded through substantially 90° at the right end of the bar, as indicated in FIG. 32.

As the bags leave the right-hand end of the bar 198 they pass in contact with a glue printing roller 208, which is rotated within a glue reservoir 210. This roller applies a stripe of adhesive, which is designated by reference character 212 in FIGS. 17, 18, 19 and 33, to the underside of each bag 76 as the latter passes in contact therewith.

To the right of the glue roller 208 the bags pass in contact with a second folding bar 214 and are supported from below by means of a trough shaped member 216 which straddles the stripe 212. The folding bar 214 has a lower flange portion 218 which, as is shown in FIGS. 19, 20 and 21 is shaped so as to change from a substantially vertical disposition at its left end to a substantially horizontal disposition at the right end of bar 214 to thereby cause the ends of the advancing bags to be folded over against the stripe of adhesive 212, the trough shaped supporting member 216 becoming shallower and terminating to the left of the left end of bar 214.

As the folded over ends of the bag pass from the folding bar 214 they enter between pressure belts 220 and 222 which are carried by rollers 224 and 226, respectively, which belts are driven at the same speed as carrying belts 190, 191, 192 and 193. During their passage between these pressure belts the folded over ends of the bags are pressed against the strip 212 so as to permit the adhesive to set, thus holding the bags in folded over position.

As the finished containers are discharged from the right-hand ends of the carrying belts 190, 191, 192 and 193 they are deposited on a belt conveyor 228 moving to the right from which they may be picked up by an operator and packed in suitable containers.

It will thus be seen that the dust bags are moved through a path which is divided into three parts. In the first part the bags and discs travel in spaced relationship and are glued together. In the second portion of the path the speed of travel of the bags and discs is reduced sufficiently to bring the side edges of adjacent bags into close proximity in order that a continuous strip of tape may be applied to the open ends of the bags. It is highly desirable to have the bags close together at this time so that there will be no tape wasted and so that it will not be necessary to dispose of waste pieces of tape to which adhesive has been applied. During the third portion of the path, after the bags have been separated by severance of the tape between bags, they are again speeded up in order to space the discs from each other so that they may be carried by the carrying belts during the folding over steps. If the discs were still in overlapped position it would be difficult, if not impossible, to have them properly carried between the carrying belts.

While we have shown and described one more or less specific embodiment of our invention, it is to be understood that this has been done for purposes of illustration only and that the scope of our invention is not to be limit-

What we claim is:

1. In a device for closing the ends of dust bags, means for moving the bags with open ends transversely along a path in spaced relation to each other, means for reducing the spacing of said bags, means for adhering approximately one-half the width of a continuous strip of sealing tape to the bags adjacent to their open ends as the bags move along said path in closely spaced relation, the other half of the width of said tape extending beyond the open ends of the bags, means for applying a stream of adhesive to said other half to cause adhesive to flow into said open ends, means for folding said other half over the open ends to thereby close the latter, means for applying pressure to the folded over strip to cause it to adhere to the bags, and means for thereafter severing said folded strip between each bag.

2. In a device for closing the ends of dust bags, means for moving the bags with open ends transversely along a path in spaced relation to each other, means for reducing the spacing of said bags, means for forming a longitudinal center crease in a continuous strip of sealing tape, means for adhering the half of said strip on one side of said crease to the ends of the bags as the latter move along said path in closely spaced relation, the other half of said strip extending beyond and at an upward angle to the open ends of the bags, means for introducing a stream of adhesive into the trough formed by the creased tape to cause some of the adhesive to flow into said open ends, means for folding said other half over the open ends to thereby close the latter, means for applying pressure to the folded over strip to cause it to adhere to the bags, and means for thereafter severing said folded strip between each bag.

3. In a device for closing the ends of dust bags, means for moving the bags with open ends transversely along a first portion of a path at a given speed and in spaced relation to each other, means for moving the bags along a second portion of said path at a slower speed for reducing the spacing of said bags, means for moving a continuous strip of sealing tape at said slower speed, means for adhering approximately one-half the width of said strip to the bags adjacent to their open ends as the bags move along the second portion of said path in closely spaced relation, the other half of the width of said tape extending beyond the open ends of the bags, means for applying a stream of adhesive to said other half to cause adhesive to flow into said open ends, means for folding said other half over the open ends to thereby close the latter, means for applying pressure to the folded over strip to cause it to adhere to the bags, and means for thereafter severing said strip between each bag.

4. In a device for closing the ends of dust bags, means for moving the bags with open ends transversely along a first portion of a path at a given speed and in spaced relation to each other, means for moving the bags along a second portion of said path at a slower speed for reducing the spacing of said bags, means for moving a continuous strip of sealing tape at said lower speed, means for forming a longitudinal center crease in said strip, means for adhering the half of said strip on one side of said crease to the bags adjacent to their open ends as the bags move along the second portion of said path in closely spaced relation, the other half of the width of said tape extending beyond and at an upward angle to the open ends of the bags, means for introducing a stream of adhesive into the trough formed by the creased tape to cause adhesive to flow into said open ends, means for folding said other half over the open ends to thereby close the latter, means for applying pressure to the folded strip to cause it to adhere to the bags, and means for thereafter severing said strip between each bag.

5. In a device for closing the ends of dust bags which bags have attached to their opposite ends stiff plate members extending transversely beyond the side edges of the bags, means for moving the bags with open ends transversely along the first portion of a path at a given speed with said plate members in spaced relation to each other, means for moving the bags along a second portion of said path at a reduced speed to cause overlapping of adjacent plate members to reduce the space between the side edges of adjacent bags, means for moving a continuous strip of sealing tape at said reduced speed, means for adhering approximately one-half the width of said strip to the bags adjacent to their open ends as the bags move along the second portion of said path with their side edges in closely spaced relation, the other half of the width of said strip extending beyond the open ends of the bags, means for applying a stream of adhesive to said other half to cause adhesive to flow into said open ends, means for folding said other half over the open ends to thereby close the latter, means for applying pressure to the folded over strip to cause it to adhere to the bags, and means for thereafter severing said folded strip between each bag.

6. In a device for closing the ends of dust bags which bags have attached to their opposite ends stiff plate members extending transversely beyond the side edges of the bags, means for moving the bags with open ends transversely along the first portion of a path at a given speed with said plate members in spaced relation to each other, means for moving the bags along a second portion of said path at a reduced speed to cause overlapping of adjacent plate members to reduce the space between the side edges of adjacent bags, means for moving a continuous strip of sealing tape at said reduced speed, means for forming a longitudinal center crease in said strip, means for adhering the portion of said strip on one side of said crease to the bags adjacent to their open ends as the bags move along the second portion of said path with their side edges in closely spaced relation, the portion of said strip on the other side of said crease extending beyond and at an upward angle to the open ends of the bags, means for introducing a stream of adhesive into the trough formed by the creased tape to cause adhesive to flow into said open ends, means for folding said extending portion over the open ends to thereby close the latter, means for applying pressure to the folded over strip to cause it to adhere to the bags, and means for thereafter severing said folded strip between each bag.

7. In a device for closing the ends of dust bags which bags have attached to their opposite ends stiff plate members extending transversely beyond the side edges of the bags, means for moving the bags with open ends transversely along the first portion of a path at a given speed with said plate members in spaced relation to each other, means for moving the bags along a second portion of said path at a slower speed to cause overlapping of adjacent plate members to reduce the space between the side edges of adjacent bags, means for applying a continuous strip of sealing tape to the open ends of the bags as the latter move along said second portion of said path with their side edges in closely spaced relation, means for thereafter severing said strip between each bag, means for moving said bags along a third portion of said path at an increased speed to separate said plate members, means for applying a stripe of adhesive to each bag adjacent and parallel to its taped closed end, means for folding over said taped end against said stripe, and means for applying pressure to said folded over end to cause said adhesive to set.

8. In a device for closing the ends of dust bags which bags have attached to their opposite ends stiff plate members extending transversely beyond the side edges of the bags, means for moving the bags with open ends transversely along the first portion of a path at a given speed with said plate members in spaced relation to each other, means for moving the bags along a second portion of said path at a slower speed to cause overlapping of adjacent plate members to reduce the space between the side edges of adjacent bags, means for moving a continuous strip of sealing tape at said slower speed, means for adhering approximately one-half of the width of said strip to the bags adjacent to their open ends as the bags move along the second portion of said path in closely spaced relation, the other half of said tape extending beyond the open ends of the bags, means for applying a stream of adhesive to said other half to cause adhesive to flow into said open ends, means for folding said other half over the open ends to thereby close the latter, means for applying pressure to the folded over strip to cause it to adhere to the bags, means for thereafter severing said strip between each bag, means for moving said bags along a third portion of said path at an increased speed to separate said plate members, means for applying a stripe of adhesive to each bag adjacent and parallel to its taped closed end, means for folding over said taped end against said stripe, and means for applying pressure to said folded over end to cause the adhesive in said stripe to set.

9. In a device for closing the ends of dust bags which bags have attached to their opposite ends stiff plate members extending transversely beyond the side edges of the bags, means for moving the bags with open ends transversely along the first portion of a path at a given speed with said plate members in spaced relation to each other, means for moving the bags along a second portion of said path at a slower speed to cause overlapping of adjacent plate members to reduce the space between the side edges of adjacent bags, means for moving a continuous strip of sealing tape at said slower speed, means for forming a longitudinal center crease in said strip, means for adhering the portion of said strip on one side of said crease to the bags adjacent to their open ends as the bags move along the second portion of said path in closely spaced relation, the other portion of said tape extending beyond and at an upward angle to the open ends of the bags, means for introducing a stream of adhesive into the trough formed by the creased tape to cause adhesive to flow into said open ends, means for folding said other portion over the open ends to thereby close the latter, means for applying pressure to the folded strip to cause it to adhere to the bags, means for thereafter severing said strip between each bag, means for moving said bags along a third portion of said path at an increased speed to separate said plate members, means for applying a stripe of adhesive to each bag adjacent and parallel to its taped closed end, means for folding over said taped end against said stripe, and means for applying pressure to said folded over end to cause the adhesive in said stripe to set.

10. That improvement in the method of closing the ends of flexible containers which includes the steps of moving the containers in spaced relationship along a path with their open ends parallel to the direction of movement, reducing the shape between the containers so as to bring the side edges of adjacent containers into close proximity with each other, introducing adhesive into the open ends of said containers, and applying a continuous strip of sealing tape to said open ends as the containers move along said path in closely spaced relation, and thereafter severing the strip between each container.

11. That improvement in the method of closing the ends of flexible containers which includes the steps of moving the containers at a given speed and in spaced relationship along a first portion of a path with their open ends parallel to the direction of movement, continuing the movement of the containers at a slower speed along a second portion of the path in order to reduce the space between the containers sufficiently to bring the side edges of adjacent containers into close proximity with each other, forming a longitudinal center crease in a continuous strip of sealing tape to form the latter into a trough, moving the creased tape along the second portion of the path at said slower speed and adhering the half of the tape on one side of the crease to the containers adjacent to their open ends as the containers are moved along the second portion of said path, introducing adhesive into the open ends of said containers by flowing the adhesive into the trough formed adjacent to said open ends by the creased tape, folding the portion of the tape on the other side of said crease over the open ends, applying pressure to the folded over tape, and thereafter severing the folded tape between each container.

12. That improvement in the method of closing the ends of flexible containers which includes the steps of moving the containers at a given speed and in spaced relationship along a first portion of a path with their open ends parallel to the direction of movement, continuing the movement of the containers at a slower speed along a second portion of the path in order to reduce the space between the containers sufficiently to bring the side edges of adjacent containers into close proximity with each other, moving a a continuous strip of sealing tape along the second portion of the path at said slower speed and applying it to the ends of the containers as the latter are moved along the second portion of the path, thereafter severing the tape between each container, moving the containers at an increased speed along a third portion of the path to increase the space between them, applying a stripe of adhesive to each container parallel and adjacent to its taped end, folding over said taped end against said stripe, and applying pressure to the folded over end.

13. That improvement in the method of closing the ends of flexible containers which includes the steps of moving the containers in spaced relationship along a path with their open ends parallel to the direction of movement, reducing the space between the containers so as to bring the side edges of adjacent containers in close proximity with each other, introducing adhesive into the open ends of said containers and applying a continuous strip of sealing tape to said open ends as the containers move along said path in closely spaced relation, thereafter severing the strip between each container, increasing the space between the containers, applying a stripe of adhesive to each container parallel and adjacent to its taped end, folding over said taped end against said stripe, and applying pressure to the folded over end.

14. That improvement in the method of closing the ends of flexible containers to the opposite ends of which are attached stiff plate members extending transversely beyond the side edges of the containers which includes the steps of moving the containers at a given speed along a first portion of a path with the plate members spaced from each other, continuing the movement of the containers at a slower speed along a second portion of the path in order to reduce the space between the containers sufficiently to overlap the plate members and to bring the side edges of adjacent containers into close proximity with each other, moving a continuous strip of sealing tape along the second portion of the path at said slower speed, introducing adhesive into the open ends of said containers and applying the moving strip of sealing tape to the ends of the containers as the latter are moved along the second portion of the path, severing the applied tape between each container, continuing the movement of the containers at an increased speed along a third portion of the path in order to increase the space between the containers sufficiently to separate the plate members from each other, applying a stripe of adhesive to each container parallel and adjacent to its taped end, folding over said taped end against said stripe, and applying pressure to the folded over end.

15. In a device for manufacturing dust containers, means for moving stiff plate members along a first portion of a path at a given speed and in spaced relation to each other, means for applying adhesive to one face of each plate member, means for moving partially formed bags open at one end and having a width less than that of said plate members transversely along said portion of said path at said speed and with the other end of each bag in registry with said face of a plate member, means for pressing said other end of each bag against said face to cause the adhesive to unite the bag with the plate member, means for moving the united bags and plate members along a second portion of said path at a slower speed for reducing the spacing of the united bags and plate members to bring the edges of adjacent bags into close proximity, means for moving a continuous strip of sealing tape at said slower speed and applying it to said open ends of the bags as the latter move along the second portion of said path in closely spaced relation, and means for thereafter severing said strip between adjacent bags.

16. In a device for manufacturing dust containers, means for moving stiff plate members along a first portion of a path at a given speed in spaced relation to each other, means for applying adhesive to one face of each plate member, means for moving partially formed bags open at one end and having a width less than that of said plate members transversely along said portion of said path at said speed and with the other end of each bag in registry with said face of a plate member, means for pressing said other end of each bag against said face to cause the adhesive to unite the bag with the plate member, means for moving the united bags and plate members along a second portion of said path at a slower speed for reducing the spacing of the united bags and plate members to bring the edges of adjacent bags into close proximity, means for moving a continuous strip of sealing tape at said slower speed and adhering approximately one-half the width of said sealing tape to the bags adjacent to their open ends as the bags move along the second portion of said path in closely spaced relation, the other half of the width of the tape extending beyond the open ends of the bags, means for folding said other half of the tape over the open ends of the bags to thereby close the latter, and means for thereafter severing said folded strip between adjacent bags.

17. In a device for manufacturing dust containers, means for moving stiff plate members along a first portion of a path at a given speed and in spaced relation to each other, means for applying adhesive to one face of each plate member, means for moving partially formed bags open at one end and having a width less than that of said plate members transversely along said portion of said path at said speed and with the other end of each bag in registry with said face of a plate member, means for pressing said other end of each bag against said face to cause the adhesive to unite the bag with the plate member, means for moving the united bags and plate members along a second portion of said path at a slower speed for reducing the spacing of the united bags and plate members sufficiently to cause overlapping of adjacent plate members and to bring the edges of adjacent bags into close proximity, means for moving a continuous strip of sealing tape at said slower speed and applying it to said open ends of the bags as the latter move along the second portion of said path in closely spaced relation, means for thereafter severing said strip between adjacent bags, means for thereafter moving said united bags and plate members along a third portion of said path at a sufficiently increased speed to separate said overlapped plate members, means for applying a stripe of adhesive to each bag adjacent and parallel to its taped closed end, means for folding over said taped end against said stripe, and means for applying pressure to said folded over end to cause said adhesive to set .

18. That improvement in the method of fabricating vacuum cleaner dust containers which includes the steps of moving stiff plate members along a path in spaced relation to each other, applying adhesive to one face of each plate member, moving partially formed bags open at one end and having a width less than that of said plate members transversely along said path with the other end of each bag in registry with said face of a plate member, pressing each moving bag and plate member together to cause them to be joined by the adhesive to form a dust container, reducing the speed of travel of said dust containers sufficiently to overlap adjacent plate members and to bring the side edges of adjacent bags close together, applying a continuous strip of sealing tape to the open ends of the bags as the latter move along said path in closely spaced relation, and thereafter severing the strip between each bag.

19. In a device for closing the ends of dust bags, means for moving the bags with open ends transversely along a path in spaced relation to each other, means for adhering approximately one-half the width of a continuous strip of sealing tape to the bags adjacent to their open ends as the bags move along said path in closely spaced relation, the other half of the width of said tape extending beyond the open ends of the bags, means for applying a stream of adhesive onto said other half in a quantity and manner to cause adhesive to flow into said open ends, means for folding said other half over the open ends to thereby close the latter, means for applying pressure to the folded over strip to cause it to adhere to the bags, and means for thereafter severing said folded strip between each bag.

20. In a device for closing the ends of dust bags, means for moving the bags with open ends transversely along a path in spaced relation to each other, means for forming a longitudinal center crease in a continuous strip of sealing tape, means for adhering the half of said strip on the one side of said crease to the ends of the bags as the latter move along said path in closely spaced relation, the other half of said strip extending beyond and at an upward angle to the open ends of the bags, means for introducing a stream of adhesive into the trough formed by the creased tape to cause some of the adhesive to flow into said open ends, means for folding said other half over the open ends to thereby close the latter, means for applying pressure to the folded over strip to cause it to adhere to the bags, and means for thereafter severing said folded strip between each bag.

References Cited in the file of this patent

UNITED STATES PATENTS

| | | |
|---|---|---|
| 2,013,672 | Royal | Sept. 10, 1935 |
| 2,033,223 | Bergstein | Mar. 10, 1936 |
| 2,047,894 | Sharkey | July 14, 1936 |
| 2,177,117 | Potdevin | Oct. 24, 1939 |
| 2,779,255 | Clark et al. | Jan. 29, 1957 |
| 2,811,905 | Kennedy | Nov. 5, 1957 |
| 2,820,424 | Klasing | Jan. 21, 1958 |